(12) United States Patent
Wakabayashi et al.

(10) Patent No.: US 10,655,579 B2
(45) Date of Patent: May 19, 2020

(54) FUEL SUPPLY SYSTEM

(71) Applicant: NIKKI CO., LTD., Atsugi-Shi (JP)

(72) Inventors: Teruyuki Wakabayashi, Kanagawa-Ken (JP); Yukinori Suematsu, Kanagawa-Ken (JP)

(73) Assignee: Nikki Co., Ltd. (JP)

( * ) Notice: Subject to any disclaimer, the term of this patent is extended or adjusted under 35 U.S.C. 154(b) by 68 days.

(21) Appl. No.: 15/851,679

(22) Filed: Dec. 21, 2017

(65) Prior Publication Data

US 2018/0180000 A1 Jun. 28, 2018

(51) Int. Cl.
*F02M 37/00* (2006.01)
*F16K 24/04* (2006.01)

(52) U.S. Cl.
CPC ....... *F02M 37/0023* (2013.01); *F16K 24/044* (2013.01)

(58) Field of Classification Search
CPC .. F02M 37/0023; F16K 24/044; F16K 17/366
See application file for complete search history.

(56) References Cited

U.S. PATENT DOCUMENTS

| | | | | |
|---|---|---|---|---|
| 5,389,245 A | * | 2/1995 | Jaeger | F02M 37/20 123/497 |
| 5,456,235 A | * | 10/1995 | Porter | B60K 15/077 123/509 |
| 2007/0209641 A1 | * | 9/2007 | Danjyo | F02M 37/0094 123/495 |
| 2008/0295593 A1 | | 12/2008 | Yokoo | |
| 2014/0338752 A1 | * | 11/2014 | Moreno | F02M 37/0023 137/2 |
| 2016/0016463 A1 | * | 1/2016 | Kimura | B60K 15/03 137/565.01 |
| 2016/0236566 A1 | * | 8/2016 | Ishitoya | F02M 37/0011 |
| 2016/0363103 A1 | * | 12/2016 | Kimura | F02M 37/08 |
| 2017/0167455 A1 | * | 6/2017 | Jung | B01D 29/90 |
| 2017/0292481 A1 | * | 10/2017 | Fukuoka | F02M 37/00 |

FOREIGN PATENT DOCUMENTS

JP 2008-297941 A 12/2008

* cited by examiner

*Primary Examiner* — Phutthiwat Wongwian
*Assistant Examiner* — Sherman D Manley
(74) *Attorney, Agent, or Firm* — Fishman Stewart PLLC

(57) ABSTRACT

A fuel supply system includes a housing including a housing body in which a fuel storage tank serving as a reservoir tank as well and a lid covering an opening of the housing body in an air-tight manner. The housing includes a fuel pump, a regulator configured to regulate a pressure of the fuel to return excess fuel to the fuel storage tank, a regulator holding member supporting the regulator, and a fuel storage volume adjusting unit that maintains the liquid surface level of the stored fuel at a fixed level. The fuel supply system supplies fuel at a predetermined pressure from a fuel discharging pipe of the lid to the engine. The regulator holding member is formed in such a manner in a planar view as to fill most of interspace in the opening of the housing body to close the upper portion of the fuel storage tank.

7 Claims, 4 Drawing Sheets

FUEL SUPPLY SYSTEM

CROSS-REFERENCE TO RELATED APPLICATIONS

This application claims priority to Japanese Patent Application No. JP-2016-249012, filed on Dec. 22, 2016, which is hereby incorporated by reference in its entirety.

TECHNICAL FIELD

The present invention relates to a fuel supply system disposed in a fuel supply channel connecting a fuel tank to an engine. In particular, the present invention relates to a fuel supply system including a fuel storage tank in addition to a fuel pump and a regulator, so that the fuel supply system can serve as a reservoir as well.

BACKGROUND

A fuel supply system including a fuel storage tank in addition to a fuel pump and a regulator to serve as a reservoir as well has been used in a fuel supply channel extending from a fuel tank to an engine, in order to achieve stable fuel supply without interruption, even when a sudden acceleration or deceleration occurs during supplying liquid fuel stored in a fuel tank to the engine.

A known example of such a fuel supply system is disclosed, for example, in Japanese Patent Application Laid-Open Publication No. 2008-297941 in which a fuel supply system includes a fuel pump that pneumatically supplies fuel stored in a fuel storage tank, which serves as a reservoir tank as well, toward the engine, a fuel storage volume adjusting unit having a float that maintains the liquid surface of the stored fuel at a predetermined level, and a regulator as a fuel pressure adjusting unit. The fuel that has become excessive by regulating the pressure is made to flow downward to the fuel storage tank from a return port formed under the regulator.

However, the downflow of the excess fuel disturbs the liquid surface of the stored fuel and moves the float. This impedes fixing of the stored fuel level and eventually prevents stable supply of fuel to the engine. Meanwhile, the fuel storage tank of the fuel supply system typically includes a function to deposit and remove moisture or foreign matters in the fuel. If the excess fuel flows downward from the regulator, the foreign matters deposited on the bottom of the fuel storage tank would be diffused in the stored fuel and conveyed directly to the engine.

To address these problems, the applicant of the present invention has previously proposed, in Japanese Patent Application Laid-Open Publication No. 2016-205169, a regulator holding member disposed over a fuel storage tank, in which an excess fuel discharge channel is formed extending from a recess that receives the regulator to an inner wall surface of the fuel storage tank. Excess fuel is returned through the excess fuel discharge channel. This enables stabilization of the level of the stored fuel, while avoiding the disturbance of the liquid surface of the stored fuel, thus eliminating adverse effects generated in association with the downflow of the excess fuel.

Meanwhile, the fuel supply system developed heretofore may include the regulator holding member described above, and may also have an open space above the fuel storage tank opened toward the upper space of the housing. This causes the adverse effects mentioned above associated with the downflow of the excess fuel. In addition, if the liquid surface of the fuel changes significantly by a vibration applied externally, the fuel would move up and down in the housing. Such up and down movement may also change the stored fuel level, making the stable fuel supply be further difficult. In addition, the movement of the fuel in the upper space of the housing would cause external leakage of the fuel through a path such as an atmosphere communication path.

In addition, a large movement of the liquid surface of the fuel by the vibration, as well as the vibration itself, would cause breakage or dropping of the harness and the joint portion of the fuel pump, leading to failure of operation of the fuel supply system. Therefore, it has been desired to develop a fuel supply system that can achieve stable fuel supply while minimizing the adverse effect associated with the vibration applied to the system, as well as the adverse effect associated with the downflow of the excess fuel.

SUMMARY

The present invention has been made to solve the above problems and, it is an object to provide a fuel supply system serving as a reservoir as well that is disposed in a fuel supply channel extending to an engine, in order to minimize occurrence of adverse effects caused by vibration applied to the fuel supply system to eventually achieve stable fuel supply.

According to an embodiment of the present invention, a fuel supply system disposed in a fuel supply channel extending from a fuel tank to an engine includes a housing including a housing body in which a fuel storage tank serving as a reservoir tank as well and a lid covering an opening of the housing body in an air-tight manner, a fuel pump configured to pneumatically supply stored fuel, a regulator configured to regulate a pressure of the pneumatically supplied fuel to a predetermined pressure to return excess fuel to the fuel storage tank, a regulator holding member configured to support the regulator over the fuel storage tank, and a fuel storage volume adjusting unit configured to maintain a liquid surface of the stored fuel in the fuel storage tank at a fixed level, in which the fuel supply system supplies fuel under a predetermined pressure to the engine from a fuel discharging pipe formed protruding externally on the lid, the fuel pump, the regulator, the regulator holding member, and the fuel storage volume adjusting unit are stored in the housing, the regulator holding member holds the regulator on an upper surface side of the regulator holding member, and the regulator holding member is formed in such a manner in a planar view as to fill most of interspace formed in the opening of the housing body, except for an upper end side of the fuel pump, to close the top of the fuel storage tank with the lid and decrease a range of movement of the liquid surface of the stored fuel.

The regulator holding member holding the regulator on the fuel storage tank is configured to fill the interspace formed in the opening of the housing body to close the upper portion of the fuel storage tank. Accordingly, even when the vibration is applied to the fuel supply system, it is possible to prevent excessive movement of the liquid surface of the stored fuel and facilitate stable fuel supply, while minimizing entry and leakage of the fuel to and from the upper space of the housing.

In the fuel supply system, the regulator holding member includes an excess fuel discharge channel formed in a gutter-like shape and extending from a recess that houses the lower portion of the regulator with a return port to an inner wall surface forming the fuel storage tank, and the excess fuel discharged from the regulator is returned to the fuel storage tank along the inner wall surface from a tip end side of the excess fuel discharge channel. Accordingly, the movement of the liquid surface is reduced to further resist vibration and decrease the disturbance of the liquid surface even when the excess fuel flows down to the fuel storage tank. Thus, the stable fuel supply can be achieved.

Further, in the fuel supply system, the lid includes an atmosphere communication path communicating inside and outside of the housing, the regulator holding member includes a support formed protruding from an upper surface of the regulator holding member, and supporting a valve ball which closes an opening of the atmosphere communication path under the atmosphere communication path, and the support includes predetermined irregularity formed on an upper end surface of the support at least near the lid, whereby the irregularity serves as resistance when the stored fuel enters the atmosphere communication path in a case where the fuel supply system is in an overturned state. Accordingly, the leakage of the fuel from the atmosphere communication path can be minimized before the valve ball serves as a stopper.

Further, in the fuel supply system, the regulator holding member includes a supporting structure of a harness extending from the fuel pump, the supporting structure is disposed at a position of the harness before the harness is connected to a terminal formed inside the lid, and the supporting structure supports a terminal of the harness upward under the terminal of the lid and holds a connected state of the harness. Accordingly, the movement of the harness of the fuel pump can be minimized and the breakage or dropping of the harness of the fuel pump can be prevented, even when the fuel supply system receives vibration applied externally, thus minimizing occurrence of a trouble of malfunction of the fuel pump.

In this case, the supporting structure of the harness is formed on a side face of the regulator holding member where the regulator holding member comes close to an outer periphery of the fuel pump, the supporting structure of the harness includes a pinching support portion for pinching and supporting both ends of the terminal of the harness disposed laterally at a base end side of the harness between opposing faces of the pinching support portion, and the supporting structure of the harness includes a claw-like pressing support portion disposed in a route of the harness extending downward and then inverted upward in a U-shape to the pinching support portion, the claw-like pressing support portion supporting the harness by pressing the harness against the side face of the regulator holding member at the lower end side of the downward portion of the harness. Accordingly, the harness extending from the fuel pump can be fixedly supported at the position between the position of the supporting structure of the harness and the tip end side of the harness. This minimizes the movement of the harness, while further avoiding the breakage or dropping of the harness.

According to the embodiment of the present invention, the regulator holding member that supports the regulator over the fuel storage tank fills the interspace formed in the opening of the housing body to close the upper portion of the fuel storage tank. This achieves the stable fuel supply, while minimizing the occurrence of the adverse effect caused by the vibration.

DETAILED DESCRIPTION

An embodiment of the present invention is described below by referring to the accompanying drawings.

Figure 1:
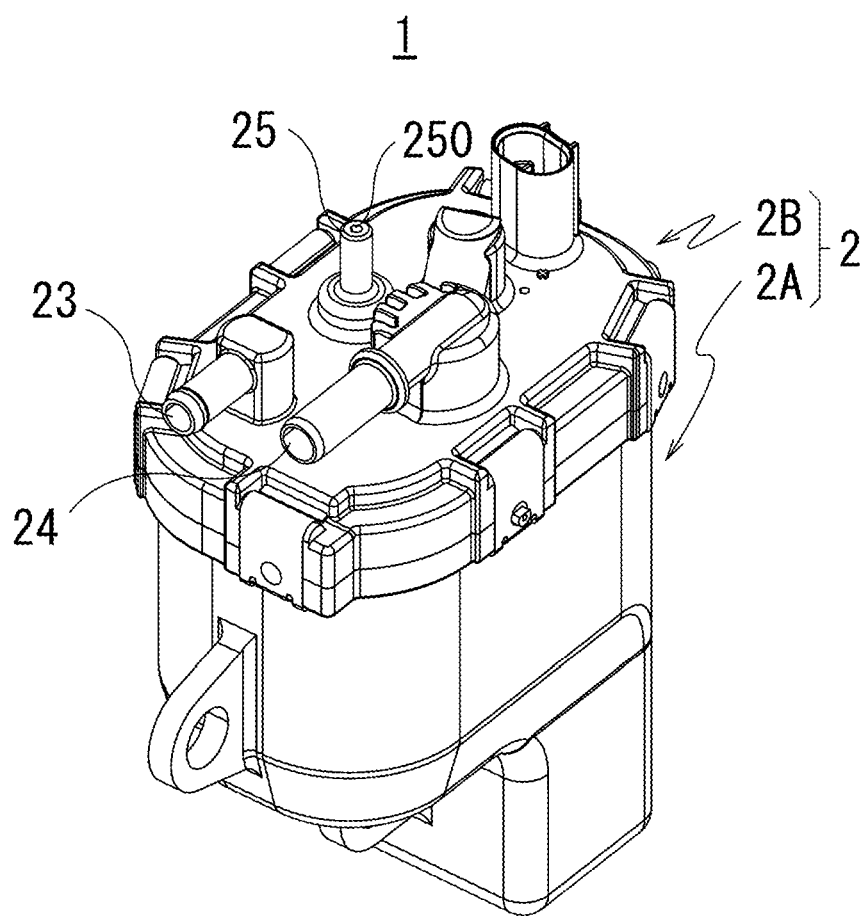
FIG. 1 is a perspective view of a fuel supply system according to an embodiment of the present invention.
Figure 2:
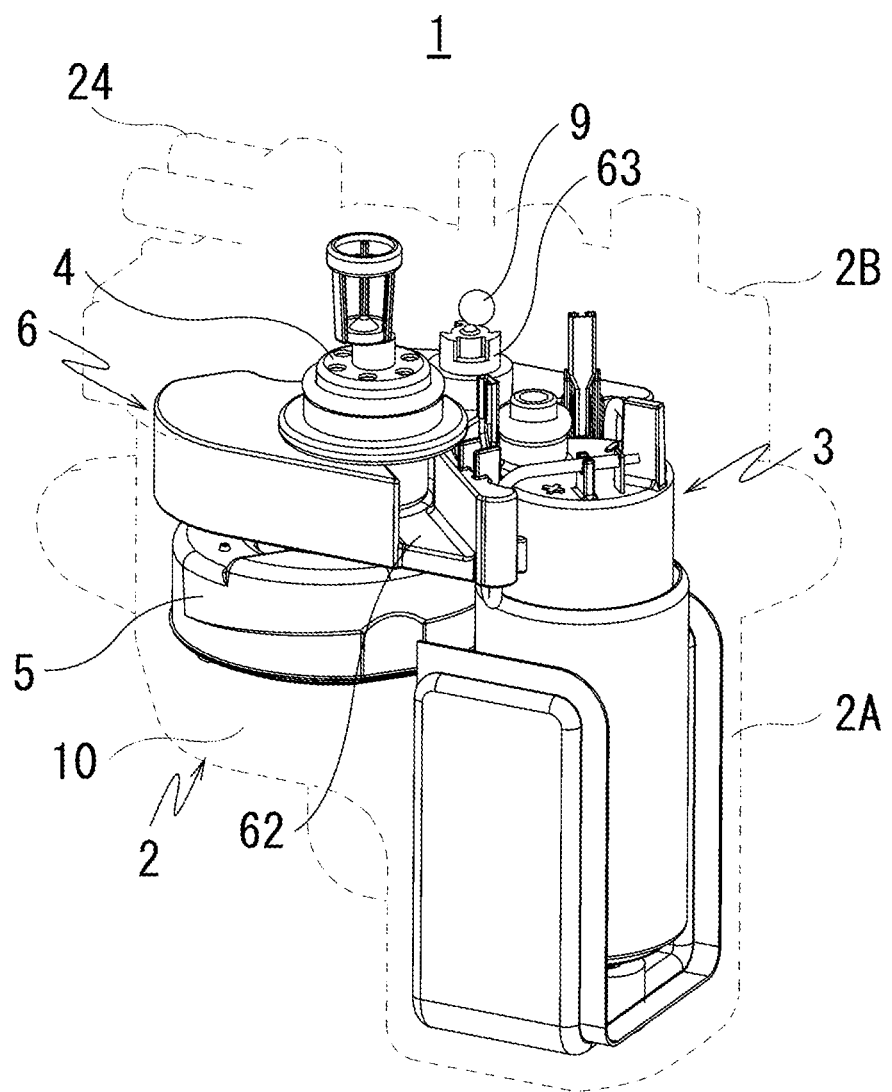
FIG. 2 is a perspective view of an inner structure of a housing of the fuel supply system of FIG. 1.

FIG. 1 is a perspective view of a fuel supply system 1 of the present embodiment including a housing 2 in which a fuel pump 3, a regulator 4, and a fuel storage tank 10 are disposed (see FIG. 2). The fuel supply system 1 is disposed in the middle of a fuel supply channel extending from a fuel tank which is not illustrated to an engine. The fuel supply system 1 serves as a fuel supply unit and a reservoir as well, allowing stable fuel supply without interruption even when a sudden acceleration or deceleration occurs.

The fuel supply system 1 includes a hollow housing 2 including a housing body 2A in which the fuel storage tank 10 which also serves as a reservoir tank is formed, and a lid 2B which closes an opening of the housing body 2A in an air-tight manner. On the upper surface of the lid 2B, a fuel introducing pipe 23 that introduces fuel, a fuel discharging pipe 24 that discharges fuel, and an atmosphere communication pipe 25 that communicates with an atmosphere communication path 250 that communicates the inside and outside of the housing 2 are disposed in protruding manners.

FIG. 2 illustrates the inner structure of the housing 2 of the fuel supply system 1 of the present embodiment. Disposed on the side of the housing body 2A that forms the fuel storage tank 10 are an electric fuel pump 3 that pneumatically supplies stored fuel, a regulator holding member 6 that holds a regulator 4 over the fuel storage tank 10, and a fuel storage volume adjusting unit that maintains the liquid surface of the stored fuel at a fixed level, while opening or closing a valve on a base end side of a valve lever, which is not illustrated, having a cantilevered float 5 on a tip end side of the fuel storage volume adjusting unit. The regulator 4 is disposed exposing toward the lid 2B on the upper surface side of the regulator holding member 6.

Thus, the regulator 4 is held on the upper surface side of the regulator holding member 6, while the regulator holding member 6 is formed in such a manner in a planar view as to fill most (at least 80%, or preferably at least 90% in a plan view) of space formed in an opening of the housing body 2A, except for the upper end side of the fuel pump 3. By closing the top of the fuel storage tank 10, the regulator holding member 6 decreases a range of movement of the liquid surface of the stored fuel.

Since the fuel storage tank 10 is covered by the regulator holding member 6, movement of a liquid surface of the stored fuel does not become excessively large, even when the fuel supply system 1 receives vibration when applied externally, and movement of the float 5 of the fuel storage volume adjusting unit can also be relatively small and ends in a short time. This facilitates stabilization of the liquid surface level of the stored fuel and achieves stable fuel supply, while preventing entry of the stored fuel into the upper space of the housing 2. As a result, the fuel hardly leaks out through the atmosphere communication path 250 or the like which communicates the inner space of the housing 2 with the atmosphere side.

Figure 3:
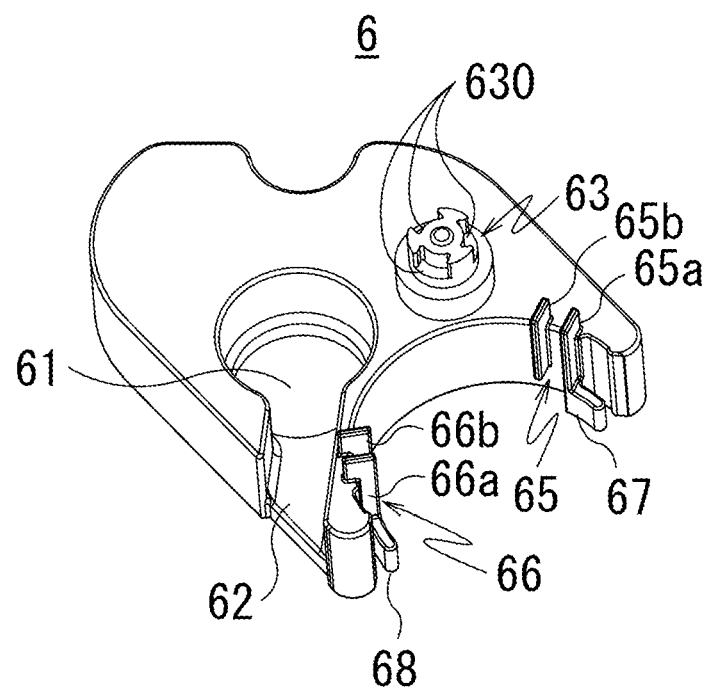
FIG. 3 is an enlarged perspective view for explaining a detailed structure of a regulator holding member of FIG. 2.

FIG. 3 is an enlarged perspective view for explaining a detailed structure of the regulator holding member 6. As mentioned above, the regulator holding member 6 is a lid-like member covering most portions of the opening of the housing body 2A except for the upper end side of the fuel pump 3, the fuel introducing path, and so on. The regulator holding member 6 supports the regulator 4 in a manner that the lower portion of the regulator 4 including a return port is accommodated in a recess 61 formed on the upper surface side of the regulator holding member 6. From the recess 61, an excess fuel discharge channel 62 formed in a gutter-like shape extends to the inner wall surface forming the fuel storage tank 10.

Since the excess fuel discharge channel 62 is disposed, the excess fuel discharged from the regulator 4 exits under the return port of the recess 61 and enters the excess fuel discharge channel 62 to flow down to the tip end of the excess fuel discharge channel 62. The excess fuel then flows along the inner wall surface near the tip end side and is returned quietly toward the liquid surface of the fuel storage tank 10. This prevents disturbance of the liquid surface even when the excess fuel dropped down from the return port of the regulator 4 flows down to the fuel storage tank 10, thus achieving further stable fuel supply.

Meanwhile, a substantially column-shaped support body 63 that supports, on the upper end side thereof, a valve ball 9 which serves as a stopper by closing the opening of the atmosphere communication path 250 under the atmosphere communication path 250 that communicates the inside and outside of the housing 2 in the lid 2B, is disposed in a protruding manner on the upper surface of the regulator holding member 6. The support body 63 includes a plurality of irregularities 630 formed on the upper end surface and the side face of the upper end surface near the lid 2B.

The fact that the irregularities 630 are disposed on the support body 63 near the atmosphere communication path 250 complicates a route of the fuel flowed into the upper space of the housing 2 to enter the atmosphere communication path 250, when the fuel supply system 1 is overturned. The shape of the irregularities can serve as resistance against the movement of the fuel, minimizing the leakage of the fuel from the atmosphere communication path 250 before the valve ball 9 serves as a stopper.

Figure 4:
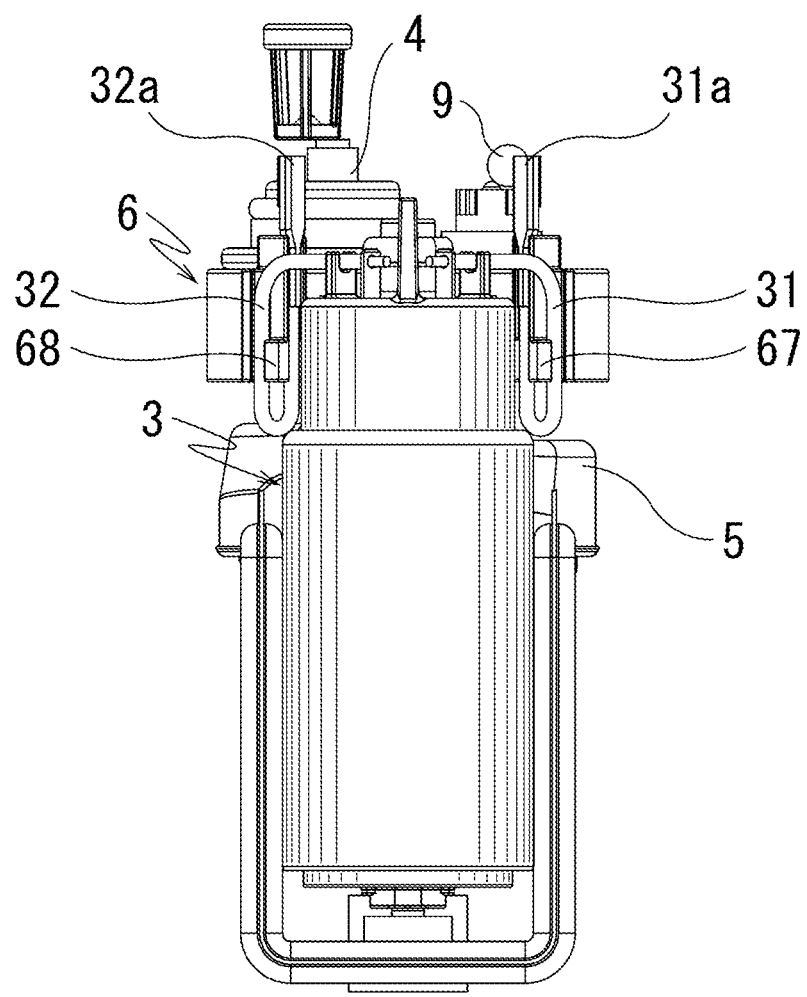
FIG. 4 is a right side view of the inner structure of FIG. 2.

Further, the regulator holding member 6 includes a supporting structure of harnesses 31 and 32 extending from the fuel pump 3, as illustrated in the right side view of the inner structure of FIG. 4. The supporting structure is disposed at a position of the harnesses 31 and 32 before terminals 31a and 32a of the harnesses 31 and 32, respectively, are connected to terminals, which are not illustrated, disposed inside the lid 2B. The supporting structure supports the terminals 31a and 32a of the harnesses 31 and 32 upward under the terminals of the lid 2B and holds a connected state of the terminals 31a and 32a and the terminals of the lid 2B. Thus, the movement of the harnesses 31 and 32 of the fuel pump 3 can be minimized when the fuel supply system 1 receives external vibration.

Namely, the supporting structure is formed on a side face (inner periphery) of an arc-shaped recess in a planar view where the regulator holding member 6 comes close to the upper outer periphery of the fuel pump 3. The supporting structure includes pinching support portions 65 and 66 for pinching and supporting both ends of the terminals 31a and 32a disposed laterally at tip ends of the harnesses 31 and 32, respectively, between opposing faces of pairs of vertical plate-like portions 65a and 65b and 66a and 66b.

In addition, the supporting structure includes claw-like pressing support portions 67 and 68 disposed in a route of the harnesses 31 and 32 extending downward and then inverted upward in a U-shape to the pinching support portions 65 and 66. The claw-like pressing support portions 67 and 68 support the harnesses 31 and 32 by pressing the harnesses 31 and 32 against the arc-shaped side face of the regulator holding member 6 at the lower end side of the downward portion of the harnesses 31 and 32. As illustrated in FIG. 4, the harnesses 31 and 32 extending from the fuel pump 3 can be fixedly supported at the position between the position of the supporting structure of the harness and the tip end side of the harness. This minimizes the movement of the harness, while further avoiding the breakage or dropping of the harness even when the vibration occurs.

As described above, the fuel supply system that serves as the reservoir as well according to the embodiment of the present invention is disposed in the fuel supply channel to the engine and can achieve stable fuel supply, while minimizing the occurrence of adverse effects associated with the vibration applied to the fuel supply system.

What is claimed is:

1. A fuel supply system disposed in a fuel supply channel extending from a fuel tank to an engine, comprising:
   a housing including a housing body in which a fuel storage tank serving as a reservoir tank as well and a lid covering an opening of the housing body in an air-tight manner;
   a fuel pump configured to pneumatically supply stored fuel;
   a regulator configured to regulate a pressure of the pneumatically supplied fuel to a predetermined pressure to return excess fuel to the fuel storage tank;
   a regulator holding member configured to support the regulator over the fuel storage tank; and
   a fuel storage volume adjusting unit configured to maintain a liquid surface of the stored fuel in the fuel storage tank at a fixed level; wherein
   the fuel supply system supplies fuel under a predetermined pressure to the engine from a fuel discharging pipe formed protruding externally on the lid,
   the fuel pump, the regulator, the regulator holding member, and the fuel storage volume adjusting unit are stored in the housing,
   the regulator holding member holds the regulator on an upper surface side of the regulator holding member, and
   the regulator holding member is formed in such a manner in a planar view as to fill most of interspace formed in the opening of the housing body, except for an upper end side of the fuel pump, to close the top of the fuel storage tank with the lid and decrease a range of movement of the liquid surface of the stored fuel,
   wherein the lid includes an atmosphere communication path communicating inside and outside of the housing, the regulator holding member includes a support formed protruding from an upper surface of the regulator holding member, and supporting a valve ball which closes an opening of the atmosphere communication path under the atmosphere communication path, and the support includes predetermined irregularity formed on an upper end surface of the support at least near the lid, whereby the irregularity serves as resistance when the stored fuel enters the atmosphere communication path in a case where the fuel supply system is in an overturned state.

2. The fuel supply system according to claim 1, wherein the regulator holding member includes an excess fuel discharge channel formed in a gutter-like shape and extending from a recess that houses the lower portion of the regulator having a return port to an inner wall surface forming the fuel storage tank, and the excess fuel discharged from the regulator is returned to the fuel storage tank along the inner wall surface from a tip end side of the excess fuel discharge channel.

3. The fuel supply system according to claim 2, wherein the lid includes an atmosphere communication path communicating inside and outside of the housing, the regulator holding member includes a support formed protruding from an upper surface of the regulator holding member, and supporting a valve ball which closes an opening of the atmosphere communication path under the atmosphere communication path, and the support includes predetermined irregularity formed on an upper end surface of the support at least near the lid, whereby the irregularity serves as resistance when the stored fuel enters the atmosphere communication path in a case where the fuel supply system is in an overturned state.

4. The fuel supply system according to claim 2, wherein the regulator holding member includes a supporting structure of a harness extending from the fuel pump, the supporting structure is disposed at a position of the harness before the harness is connected to a terminal formed inside the lid, and the supporting structure supports a terminal of the harness upward under the terminal of the lid and holds a connected state of the harness.

5. A fuel supply system disposed in a fuel supply channel extending from a fuel tank to an engine, comprising:

a housing including a housing body in which a fuel storage tank serving as a reservoir tank as well and a lid covering an opening of the housing body in an air-tight manner;

a fuel pump configured to pneumatically supply stored fuel;

a regulator configured to regulate a pressure of the pneumatically supplied fuel to a predetermined pressure to return excess fuel to the fuel storage tank;

a regulator holding member configured to support the regulator over the fuel storage tank; and a fuel storage volume adjusting unit configured to maintain a liquid surface of the stored fuel in the fuel storage tank at a fixed level, wherein the fuel supply system supplies fuel under a predetermined pressure to the engine from a fuel discharging pipe formed protruding externally on the lid, the fuel pump, the regulator, the regulator holding member, and the fuel storage volume adjusting unit are stored in the housing, the regulator holding member holds the regulator on an upper surface side of the regulator holding member, and the regulator holding member is formed in such a manner in a planar view as to fill most of interspace formed in the opening of the housing body, except for an upper end side of the fuel pump, to close the top of the fuel storage tank with the lid and decrease a range of movement of the liquid surface of the stored fuel, wherein the regulator holding member includes a supporting structure of a harness extending from the fuel pump, the supporting structure is disposed at a position of the harness before the harness is connected to a terminal formed inside the lid, and the supporting structure supports a terminal of the harness upward under the terminal of the lid and holds a connected state of the harness.

6. The fuel supply system according to claim 5, wherein the supporting structure of the harness is formed on a side face of the regulator holding member where the regulator holding member comes close to an outer periphery of the fuel pump, the supporting structure of the harness includes a pinching support portion for pinching and supporting both ends of the terminal of the harness disposed laterally at a base end side of the harness between opposing faces of the pinching support portion, and the supporting structure of the harness includes a claw-like pressing support portion disposed in a route of the harness extending downward and then inverted upward in a U-shape to the pinching support portion, the claw-like pressing support portion supporting the harness by pressing the harness against the side face of the regulator holding member at the lower end side of the downward portion of the harness.

7. A fuel supply system disposed in a fuel supply channel extending from a fuel tank to an engine, comprising:

a housing including a housing body in which a fuel storage tank serving as a reservoir tank as well and a lid covering an opening of the housing body in an air-tight manner;

a fuel pump configured to pneumatically supply stored fuel;

a regulator configured to regulate a pressure of the pneumatically supplied fuel to a predetermined pressure to return excess fuel to the fuel storage tank;

a regulator holding member configured to support the regulator over the fuel storage tank; and a fuel storage volume adjusting unit configured to maintain a liquid surface of the stored fuel in the fuel storage tank at a fixed level, wherein the fuel supply system supplies fuel under a predetermined pressure to the engine from a fuel discharging pipe formed protruding externally on the lid, the fuel pump, the regulator, the regulator holding member, and the fuel storage volume adjusting unit are stored in the housing, the regulator holding member holds the regulator on an upper surface side of the regulator holding member, and the regulator holding member is formed in such a manner in a planar view as to fill most of interspace formed in the opening of the housing body, except for an upper end side of the fuel pump, to close the top of the fuel storage tank with the lid and decrease a range of movement of the liquid surface of the stored fuel, wherein the lid includes an atmosphere communication path communicating inside and outside of the housing, the regulator holding member includes a support formed protruding from an upper surface of the regulator holding member, and supporting a valve ball which closes an opening of the atmosphere communication path under the atmosphere communication path, and the support includes predetermined irregularity formed on an upper end surface of the support at least near the lid, whereby the irregularity serves as resistance when the stored fuel enters the atmosphere communication path in a case where the fuel supply system is in an overturned state, and wherein the regulator holding member includes a supporting structure of a harness extending from the fuel pump, the supporting structure is disposed at a position of the harness before the harness is connected to a terminal formed inside the lid, and the supporting structure supports a terminal of the harness upward under the terminal of the lid and holds a connected state of the harness.

\* \* \* \* \*

UNITED STATES PATENT AND TRADEMARK OFFICE
CERTIFICATE OF CORRECTION

PATENT NO. : 10,655,579 B2  
APPLICATION NO. : 15/851679  
DATED : May 19, 2020  
INVENTOR(S) : Wakabayashi et al.

Page 1 of 1

It is certified that error appears in the above-identified patent and that said Letters Patent is hereby corrected as shown below:

On the Title Page

At Column 1, Item (30) Foreign Application Priority Date, please add the missing priority information:
Dec. 22, 2016 (JP) ....... 2016-249012

Signed and Sealed this
Thirteenth Day of October, 2020

Andrei Iancu
*Director of the United States Patent and Trademark Office*